US010500769B2

(12) United States Patent
Pan et al.

(10) Patent No.: US 10,500,769 B2
(45) Date of Patent: Dec. 10, 2019

(54) METHODS AND APPARATUS FOR DEMOLDING TIRE TREADS

(71) Applicants: Chinglin Pan, Mauldin, SC (US); Ronald Cress, Simpsonville, SC (US)

(72) Inventors: Chinglin Pan, Mauldin, SC (US); Ronald Cress, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 538 days.

(21) Appl. No.: 14/764,798

(22) PCT Filed: Jan. 31, 2013

(86) PCT No.: PCT/US2013/024175
§ 371 (c)(1),
(2) Date: Jul. 30, 2015

(87) PCT Pub. No.: WO2014/120213
PCT Pub. Date: Aug. 7, 2014

(65) Prior Publication Data
US 2015/0367539 A1    Dec. 24, 2015

(51) Int. Cl.
*B29C 37/00*    (2006.01)
*B29L 30/00*    (2006.01)

(52) U.S. Cl.
CPC ...... *B29C 37/0017* (2013.01); *B29C 2037/92* (2013.01); *B29L 2030/002* (2013.01)

(58) Field of Classification Search
CPC .............. B29C 37/0017; B29C 33/442; B29C 37/0014; B29C 2037/92; B29L 2030/002
See application file for complete search history.

(56) References Cited

U.S. PATENT DOCUMENTS

| 1,389,221 A | 8/1921 | Roussey |
| 1,784,780 A | 12/1930 | Bronson |

(Continued)

FOREIGN PATENT DOCUMENTS

| DE | 286541 A5 | 1/1991 |
| EP | 0583600 A1 | 2/1994 |

(Continued)

OTHER PUBLICATIONS

PCT/US2013/024175 International Search Report and Written Opinion dated Apr. 11, 2013, 9 pages.

*Primary Examiner* — Jacob T Minskey
*Assistant Examiner* — Melody Tsui
(74) *Attorney, Agent, or Firm* — Hahn Loeser & Parks LLP; Bret A. Hrivnak

(57) ABSTRACT

The invention includes methods and apparatus for demolding a tread from a mold. In particular embodiments, such methods include a step of demolding a first end of a tread from a mold to form a demolded portion of the tread, the tread extending lengthwise from the first end to a second end. A further step includes folding the tread such that at least a portion of the demolded portion is arranged overtop a portion of the tread remaining within the mold. Yet a further step includes applying lubricant to the tread to thereby lubricate relative translation between folded portions of the tread. A further step includes demolding additional portions of the tread by sliding at least a portion of the demolded portion along the portion of the tread remaining in the mold with the lubricant arranged between the demolded portion and the portion of the tread remaining within the mold.

18 Claims, 2 Drawing Sheets

(56) References Cited

U.S. PATENT DOCUMENTS

| | | | |
|---|---|---|---|
| 2,608,498 A | 8/1952 | Kennedy | |
| 2,843,896 A | 7/1958 | Rinella | |
| 3,829,271 A | 8/1974 | Taylor | |
| 4,066,732 A * | 1/1978 | Redmond, Jr. | B29D 29/08 |
| | | | 264/229 |
| 4,076,483 A | 2/1978 | Smirne | |
| 4,247,093 A | 1/1981 | Kistner et al. | |
| 4,371,476 A * | 2/1983 | Newkirk | B29C 33/62 |
| | | | 106/38.22 |
| 4,775,483 A | 10/1988 | Mookerjea et al. | |
| 4,818,203 A | 4/1989 | Majerus et al. | |
| 5,066,448 A | 11/1991 | Chlebina et al. | |
| 5,346,387 A | 9/1994 | Mueller et al. | |
| 5,738,813 A | 4/1998 | Naganawa et al. | |
| 5,895,621 A | 4/1999 | Tajiri et al. | |
| 5,919,290 A | 7/1999 | Ishikawa et al. | |
| 6,638,049 B1 | 10/2003 | Moss et al. | |
| 6,685,867 B2 | 2/2004 | Wellman et al. | |
| 6,991,208 B1 | 1/2006 | Herman | |
| 7,153,458 B2 | 12/2006 | Ide et al. | |
| 7,186,103 B2 | 3/2007 | Menard | |
| 7,234,927 B2 | 6/2007 | Ebiko et al. | |
| 2004/0197432 A1 | 10/2004 | Menard | |
| 2007/0023963 A1 | 2/2007 | Papin et al. | |
| 2007/0092594 A1 | 4/2007 | Ho et al. | |
| 2008/0149240 A1 | 6/2008 | Luneau et al. | |
| 2011/0101568 A1 | 5/2011 | Gallego et al. | |
| 2011/0148001 A1 | 6/2011 | Cress et al. | |
| 2012/0146262 A1 | 6/2012 | Adams et al. | |

FOREIGN PATENT DOCUMENTS

| | | | | |
|---|---|---|---|---|
| EP | 1306182 A2 | 5/2003 | | |
| JP | S6089313 A | 5/1985 | | |
| JP | 03-116907 U1 | 12/1991 | | |
| JP | H05104534 A | 4/1993 | | |
| JP | 05111921 A | 5/1993 | | |
| JP | 6020021 A | 1/1994 | | |
| JP | 06-023868 A | 2/1994 | | |
| JP | 8238624 A | 9/1996 | | |
| JP | 2002120301 A | 4/2002 | | |
| JP | 2004537439 A | 12/2004 | | |
| JP | 2005007713 A | 1/2005 | | |
| JP | 2007081048 A | 3/2007 | | |
| JP | 4135726 B2 | 8/2008 | | |
| JP | 2011143655 A | 7/2011 | | |
| WO | 03-013819 A1 | 2/2003 | | |
| WO | 2008057077 A1 | 5/2008 | | |
| WO | WO-2008057077 A1 * | 5/2008 | ........... | B29C 33/442 |
| WO | WO-2011025499 A1 * | 3/2011 | ......... | B29C 37/0007 |
| WO | 2013136313 A1 | 9/2013 | | |

* cited by examiner

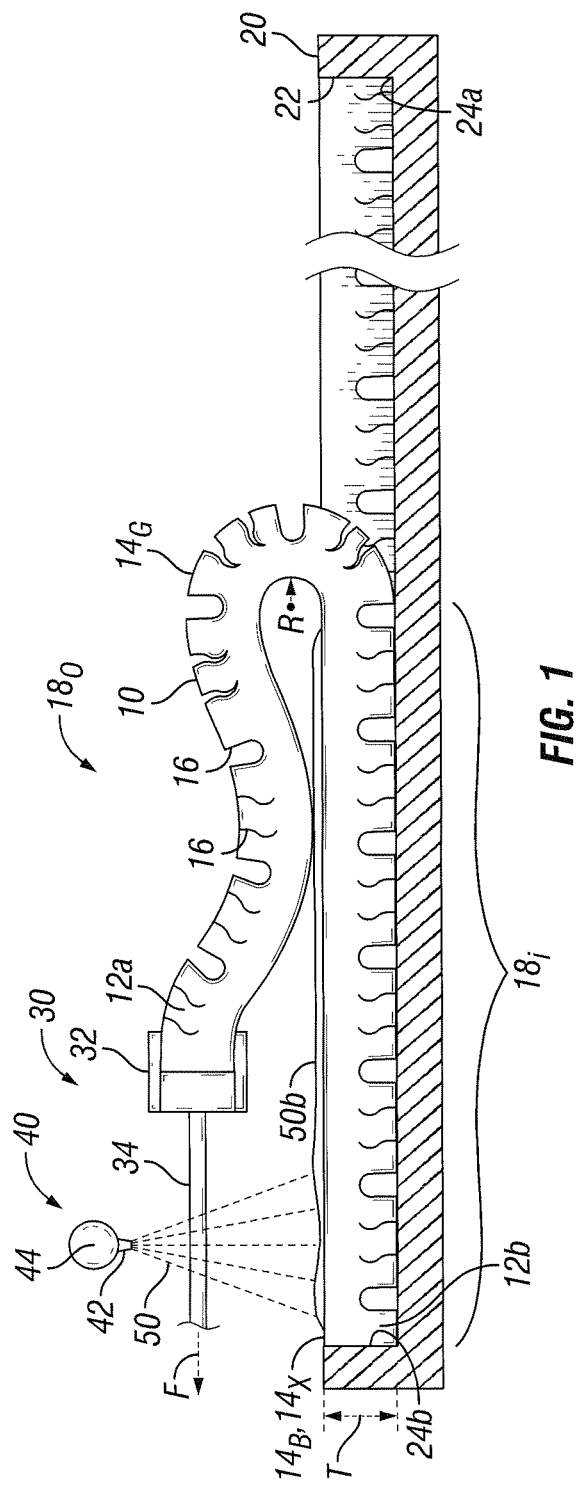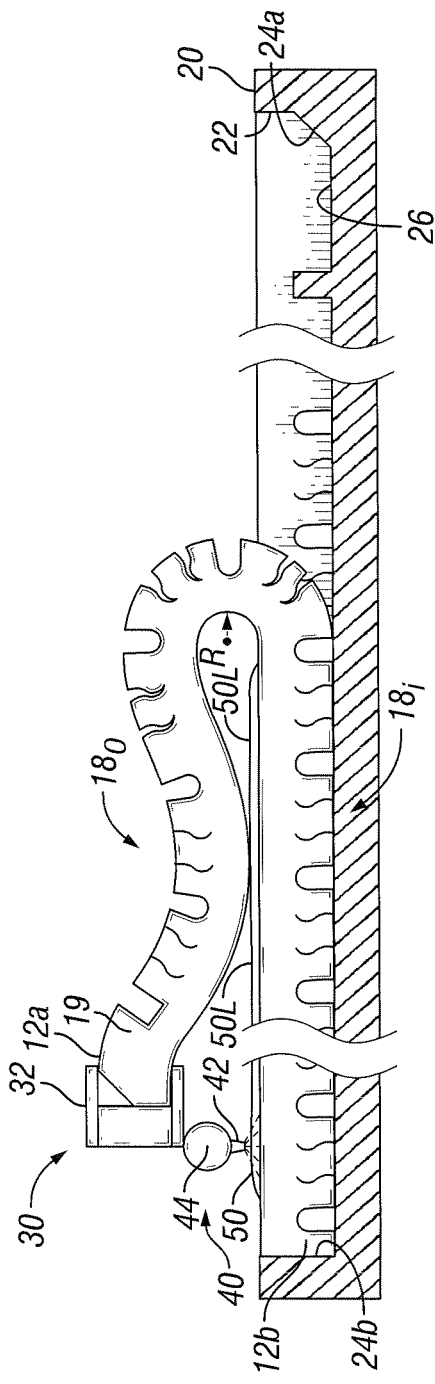

METHODS AND APPARATUS FOR DEMOLDING TIRE TREADS

BACKGROUND OF THE INVENTION

This invention relates generally to the demolding of tire treads, and more specifically, to the demolding of a strip of tread from a mold.

DESCRIPTION OF THE RELATED ART

Tire treads for retreaded tires are commonly formed according to a molding process. In the molding process, various void features are formed on a side of the tread intended to be the outer side or ground engaging side of the tread. Such void features may comprise grooves or sipes, for example. The mold includes projections arranged within a tread molding cavity and along a bottom side thereof to form the void features in the tread.

Treads for retreaded tires are commonly formed as a strip having a first end and a second end. In such instances, when demolding the tread from the mold, the first end of the tread is demolded and the tread is folded overtop itself such that a portion of the demolded tread is folded overtop a portion of the tread remaining in the molding cavity prior to removal. In such instances, friction is generated as the demolded portion is drug along the portion remaining within the molding cavity. This increases the force required to demold the tread. Accordingly, there is a need to reduce the demolding, which is referred to as the demolding force.

SUMMARY OF THE INVENTION

The present invention includes methods and apparatus for demolding a tread from a mold. In particular embodiments, such methods include a step of demolding a first end of a tread from a mold to form a demolded portion of the tread, the tread extending lengthwise from the first end to a second end. A further step of such embodiments includes folding the tread such that at least a portion of the demolded portion is arranged overtop a portion of the tread remaining within the mold. Yet a further step of such embodiments includes applying lubricant to the tread to thereby lubricate relative translation between folded portions of the tread. Finally, a further step of such embodiments includes demolding additional portions of the tread by sliding at least a portion of the demolded portion along the portion of the tread remaining in the mold with the lubricant arranged between the demolded portion and the portion of the tread remaining within the mold.

Additional embodiments of the present invention includes an apparatus for demolding a tread. In particular embodiments, the apparatus includes a member configured for attachment to a demolded portion of a tread, the demolded portion of the tread being folded over a portion of the tread remaining within a mold, the tread extending lengthwise between a first end and a second end. In such embodiments, the member includes one or more lubricant discharging elements in operational communication with a lubricant source, each of the one or more lubricant discharging elements configured to discharge lubricant received from the lubricant source onto the tread between the demolded portion and the portion of the tread remaining within the mold.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

FIG. 1 is a partially sectioned side view of a demolding process for removing a tread from a mold in accordance with a particular embodiment of the invention.

FIG. 3 is a partially sectioned side view of the tread demolding process shown in FIG. 2.

DETAILED DESCRIPTION OF PARTICULAR EMBODIMENTS

Figure 2:
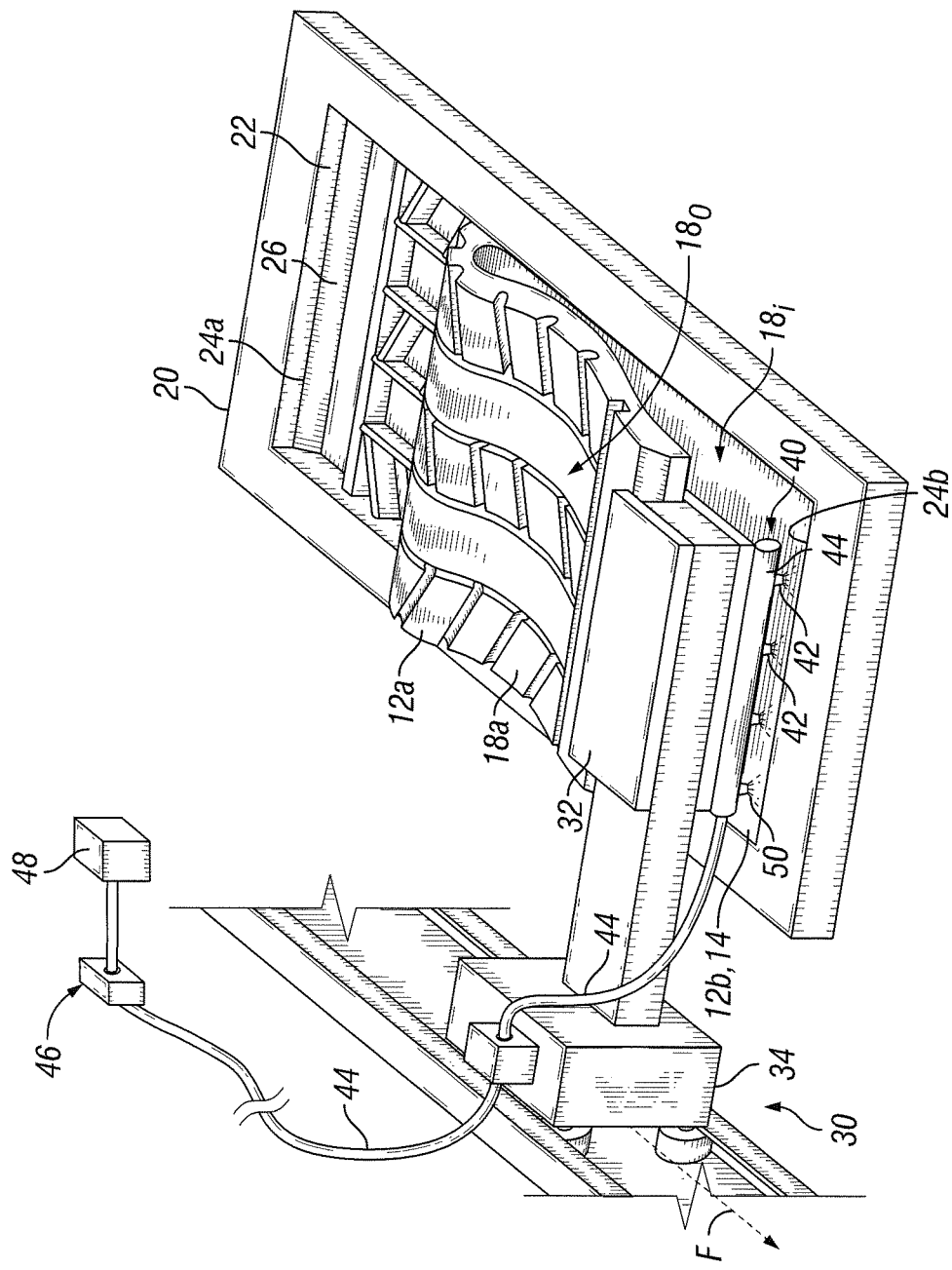
FIG. 2 is a perspective view of a tread demolding process in accordance with a particular embodiment of the invention.

The present invention comprises methods and apparatus for improving the demolding of molded treads. In particular embodiments, the inventive methods and apparatus are used to demold retread tire treads comprising a strip having a length defined by a first and a second end. However, the inventive methods and apparatus may be employed to demold any strip of tread, whether for a retreaded tire or an original tire.

Use of the inventive methods and apparatus disclosed herein have been shown to decrease the demolding forces required to demold a tread from a mold, whereby the application of a lubricant between folded portions of a tread being demolded to reduce the friction as a demolded portion of the tread slides along a portion of the tread remaining within the molding cavity.

Accordingly, particular embodiments of the present invention include methods of demolding a tread from a mold. Particular embodiments of such methods may include a step of demolding a first end of a tread from a molding cavity to form a demolded portion of the tread, the tread extending lengthwise from the first end to a second end. In such embodiments, the tread generally comprises a strip having a length extending longitudinally between a first end and a second end, and a width extending transverse to the lengthwise direction of the tread. The tread also has a thickness bounded by an outer, ground-engaging side and a bottom side. Such treads comprising a strip are later wrapped around a tire carcass to form a retreaded tire. The outer, ground-engaging side is configured to engage any surface upon which a tire may operate, which is called the ground surface. The outer, ground-engaging side of the tread may also include various void features to enhance tire performance as it operates along a ground surface. Void features may comprise, for example, grooves or sipes. Sipes can be described as forming narrow grooves. The tread may comprise any tread, whether a tread for retreading a tire or for an original tire, and may be formed of elastomeric material, such as any natural or synthetic rubber that may be vulcanized with the addition of heat according to a curing process. While retained within the molding cavity, one of the sides defining the tread thickness is exposed and is referred to as the exposed side of the tread retained or remaining within the molding cavity. The other, opposing side of the tread thickness is retained within the molding cavity. Accordingly, the exposed side of the tread may comprise one of the outer, ground-engaging side and the bottom side of the tread.

It is understood that any mold comprising any mold type or design may be employed to form such a tread within a molding cavity. For example, in particular embodiments, such a tread is molded in a cavity formed cooperatively between first and second mold members. In such instances, a molding cavity may be formed solely in the first or second mold member where the other mold member forms a plate or platen having a surface containing and sealing the cavity volume in the other member without adding any additional volume to the cavity. In an alternative, the molding cavity may be formed by combining a first molding cavity formed in the first mold member with a second molding cavity formed in the second mold member. In particular instances, the first and second mold members may comprise top and bottom mold members. In any event, it is understood that a plurality of mold members or segments are used to form a molding cavity for forming the tread.

With particular regard to the molding cavity, the cavity has a length extending longitudinally from a first end to a second end and a width extending laterally in a direction perpendicular to the lengthwise direction of the cavity. The tread molding cavity also has a thickness or depth, which may be at least equal to or less than the tread thickness and which may include projections for forming void features in a thickness of the tread. While the projections may be formed along the outer, ground-engaging side of the tread, void features may also be formed along the bottom side of the tread, such as when recessed voids are desired that which may become exposed to the ground-engaging side of the tread during the tread's useful life. It is also understood that the mold may be what is often termed as a flat mold, which is a mold where the tread molding cavity is generally planar—that is, where the length and the width generally extend in linear directions perpendicular to one another. For example, flat molds may have a tread molding cavity where the outer, ground-engaging side and/or the bottom side extend along a plane. Of course, the methods may employ any type of mold where the tread molding cavity has a first end associated with a first end of the tread and a second end associated with a second end of the tread to form a tread comprising a strip. For example, a non-flat mold may comprise a mold where the thickness of the tread molding cavity (as defined by the cavity sides associated with each of the outer, ground-engaging side and the bottom side) generally extends along a non-linear path (where the thickness of the tread molding cavity of the flat mold generally extends along a linear path).

In demolding the first end of the tread from the mold, the first end may be removed manually or automatically by any known means for removing the first end. For example, a device embodying the invention is disclosed in published International Patent Application No. WO 2008-057077A1. It is understood that any other device or tool may be used to pull, push, or lift the first end from the molding cavity. Furthermore, any such device or tool may be used to demold any other portion of the tread according to any other step of these methods, including the step of demolding additional portions of the tread, which is further discussed below.

Further embodiments of such methods include a step of folding the tread such that at least a portion of the demolded portion is arranged overtop a portion of the tread remaining within the molding cavity. In doing so, a folded tread is formed that includes folded portions of the tread. In performing this step, the tread is folded such that the tread is bent to direct a demolded portion of the tread overtop a portion of the tread remaining within the molding cavity. It is noted that the demolded portion of the tread is also referred to herein as a "demolded tread section" or "demolded section," while the portion of the tread remaining within the molding cavity is also referred to herein as an "non-demolded tread section" or "non-demolded section." In folding or bending the tread, a perfect fold need not be made but rather a gap may be present at the location where the tread is bent or folded. This gap may be in part defined by a bending radius, which defines the size of the bend along an interior side of the bend relative the tread thickness. It is understood that the step of folding the tread may be achieved manually or automatically using any known means for bending the tread. For example folding or bending may be achieved by any tool or device used, or that may be used, to demold the first end of the tread.

Further embodiments of such methods include a step of applying lubricant to the tread to thereby lubricate relative translation between folded portions of the tread. In particular embodiments, the step of lubricating comprises applying a lubricant to an exposed side of the tread. Application of the lubricant between folded portions of the tread, that is, between the demolded tread section and the non-demolded tread section, the lubricant reduces the friction between the folded portions of the tread, and thereby allows at least a portion of the demolded tread section to more easily slide along the non-demolded tread section. To achieve this, the lubricant is applied to the tread, and more specifically along an exposed side of the tread. It is understood that the demolded tread section slides relatively along an non-demolded tread section, and the lubricant may be applied to such structure or mold to also lubricate the demolded tread portion as it slides there along. In particular embodiments, the lubricant is applied after the first end of the tread has been demolded and the tread folded according to the steps of demolding the first end and folding the tread. Nonetheless, additionally or in the alternative, lubricant may be applied before the tread is folded according to the step of folding, or even before demolding the first end of the tread from the mold.

It is understood that the lubricant may be a dry or liquid lubricant. In particular embodiments, the lubricant is a water based lubricant. In one embodiment, the water based lubricant includes one or more additives to enhance the lubricating properties of the lubricant. The one or more additives may form any of a liquid and a solid. Moreover, the one or more additives may comprise water-soluble additives and/or one or more water insoluble additives. For example, the one or more additives comprises one or more surfactants, which may operate as a wetting agent, an emulsifier, or a dispersant. By further example, one or more additives may comprise stearic acid or a stearate. In particular embodiments, the lubricant comprises a water-based, oil-free mold release composition used to coat tire tread molds for easier demolding of molded treads from the molds. In such embodiments, by example, the lubricant is a water-based lubricant comprising a silicone free mold release lubricant, such as one sold by Barbe (www.barbe.de). In such example, the lubricant comprises an aqueous dispersion of polyoxyalkylene derivatives and surfactants. Polyoxyalkylene derivatives are nonionic surfactants and may comprise, for example, a polyoxyalkylene alkyl ether, a polyoxyethylene distyrenated phenyl ether, or a polyoxyethylene oxypropylene block copolymer. In yet other embodiments, the water-based lubricant comprises water. Water may comprise purified water or other available water, which may include impurities or other supplements, such as when supplied with tap water, well water, or naturally supplied water. By employing water, in lieu of oil-based lubricants, dry lubricants, or even certain water-based lubricants, the water lubricant is able to evaporate without leaving any residue that may remain on the tread after the water has evaporated. Accordingly, use of water as a lubricant generally provides a contaminant free demolded tread.

It is understood that the lubricant may be applied to any portion of the tread. Because the purpose of applying lubricant to the tread is to lubricate portions of the tread being demolded, in particular embodiments the lubricant is arranged or applied to be arranged between folded portions of the tread. "Folded portions of the tread" include a demolded tread section folded overtop an non-demolded tread section. Therefore, in embodiments where the demolded tread section is folded over onto the exposed side of the tread, the step of applying lubricant to the tread comprises applying lubricant to the exposed side of the tread remaining within the molding cavity. Still, it is appreciated that lubricant may be applied to only a portion of the tread, including any portion of the exposed side of the non-demolded tread section. For example, lubricant may be applied to the exposed side of the non-demolded tread section as the demolded tread section slides along a portion of the non-demolded tread section. This may be achieved by applying the lubricant along the exposed side of the tread in front of, or ahead of, the portion of the demolded tread section as it slides during demolding operations. Accordingly, as the tread is being demolded, the location of lubricant application may move during demolding operations. For example, the location of lubricant application may move or translate with the first end or any other portion of the demolded tread section. In performing the step of applying lubricant, lubricant may be applied continuously or intermittently.

The amount of lubricant applied may vary based upon various demolding factors. For example, the amount of lubricant sufficient to reduce the demolding force may be based upon the weight or thickness of the tread, as heavier treads may require more lubricant to sufficiently lubricate the sliding engagement of the folded portions. Furthermore, the rate of demolding (that is, of the sliding translation) may require more or less lubricant to sufficiently lubricate the sliding interface between the folded tread portions. For example, the lower the rate of translation of the demolded portion, the more lubricant is needed to sufficiently lubricate the sliding interface. In particular embodiments, when the lubricant is water, 0.7 to 3 or 1 to 3 liters of water is discharged per minute, although flow rates equal to or less than 0.7 liters per minute and equal to or greater than 3 liters per minute may be employed in other embodiments as needed.

It is understood that the discharge of lubricant may be achieved by any desired manner to achieve the desired coverage and flow rate. For example, lubricant may be applied by pouring, injecting, or spraying the lubricant by way of any desired discharge element. For example, in particular embodiments, one or more discharge elements comprises one or more apertures. By further example, in further embodiments, one or more discharge elements comprises one or more nozzles. Accordingly, the lubricant may be airborne, such as when the lubricant is particularized as a spray, mist, or vapor. In other examples, the tread may be partially or fully submerged in liquid lubricant, such as when liquid lubricant is retained within a vat or other container into which the tread is at least partially submerged.

Particular embodiments of such methods, the step of applying lubricant includes arranging lubricant between the demolded portion and the portion of the tread remaining within the molding cavity. This step may be accomplished by any of a variety of ways. In a first embodiment, this step is accomplished by performing the step of folding the tread after the step of applying lubricant to the tread, whereby the demolded tread section is placed overtop a lubricant-coated portion of the non-demolded tread section. In a lubricant-coated portion of the tread, the lubricant coating may be continuous or discontinuous within the portion of the tread. In a second embodiment, this step is accomplished by sliding the demolded tread section overtop a lubricant-coated portion of the non-demolded tread section. In this embodiment, the step of arranging lubricant may be accomplished by performing the step of applying lubricant before or concurrently with the step of demolding additional portions of the tread. In yet another embodiment, this step of arranging lubricant may be accomplished by injecting lubricant between the demolded portion and the portion of the tread remaining within the molding cavity after performing the step of folding the tread. In each embodiment contemplated, the step may be applied by applying the lubricant to an exposed side of the tread as discussed in more detail above. It is understood that any other manner of performing the step of arranging lubricant may be employed that may be known or is obvious to one of ordinary skill.

Particular embodiments of such methods includes demolding additional portions of the tread by sliding at least a portion of the demolded portion along the portion of the tread remaining in the mold with the lubricant arranged between the demolded portion and the portion of the tread remaining within the mold. In operation, the lubricant arranged on the tread between the demolded portion and the portion of the tread remaining within the tread functions as a lubricant to reduce friction forces and the force required to slide the demolded portion along the portion of the tread remaining within the mold. Accordingly, to demold additional portions of the tread, the tread is pulled and additional portions of the tread remaining within the molding cavity are removed from the molding cavity. In pulling the tread, at least a portion of the demolded tread slides along the portion of the tread remaining within the molding cavity with the friction forces arranged therebetween to lubricate the sliding movement. The tread may be pulled by any means for pulling the tread, whether performed manually or automatically. It is understood that the act of pulling the tread from the molding cavity is achieved by relative translation between the tread and the molding cavity. Accordingly, it is understood this relative translation may be achieved by translating the tread, translating the molding cavity (and the mold), or translating both the tread and the mold.

In performing the step of demolding, it can also be said that the step includes directing the first end of the tread away from the first end of the tread demolding cavity while the tread remains folded. What this means is that the first end of the tread is directed in a direction away from the first end of the molding cavity while the tread remains folded and a portion of the demolded tread slides along the tread portion remaining within the mold.

Performance of such methods will now be discussed in association with one or more exemplary embodiments shown in the figures.

With reference to FIG. 1, a tread 10 is shown being demolded from a mold 20, and more specifically, a molding cavity 22, in accordance with the methods discussed above. As stated above, any desired mold may be employed. In FIG. 1, a "flat" mold configured to form a strip of tread is partially shown, where the bottom mold section being shown after the top platen has been removed. The molding cavity has corresponding features designed to form the various features of the tread.

With reference to the tread shown in FIG. 1, the tread 10 extends lengthwise between a first end 12a and a second end 12b, each which corresponds to a first end 24a and a second end 24b of the molding cavity 22, respectively. Tread 10 also has a thickness T bounded by an outer, ground-engaging side $14_G$ (also referred to as a top side) and a bottom side $14_B$ for attachment to a tire carcass. In the embodiment shown, the outer, ground-engaging side $14_G$ is also an exposed side $14_X$ of the tread 10 when arranged within molding cavity 22. The thickness T of the tread includes a plurality of void features 16 comprising grooves and sipes arranged in communication with the outer, ground-engaging side 14a of the tread.

With continued reference to FIG. 1, a first end 12a of the tread forming a portion of a demolded section 18o of the tread (also referred to as a "demolded tread section" or "demolded section") is shown to have already been demolded from the molding cavity 22 and bent or folded overtop a portion of a section 18i of the tread 10 remaining within the molding cavity (also referred to as an "non-demolded tread section" or "non-demolded section"), which includes the second end 12b of the tread. The inside of the bend or fold is defined by a bending radius R. In forming the bend or fold, the demolded tread section 18o is at least partially arranged overtop the non-demolded tread section 18i. It can also be said that at least a portion of the demolded tread section comes to rest atop the non-demolded tread section. In resting atop the non-demolded tread section, the demolded tread section 18o may be in complete or partial contact (that is, engagement) with the non-demolded tread section, or may partially or fully contact a layer, coating, or film of lubricant arranged between the folded tread sections 18o, 18i. If the folded tread sections 18o, 18i are in contact with each other and without any lubricant 50 arranged therebetween, lubricant will later be arranged between the folded tread sections 18o, 18i. It is understood that a portion of the demolded section 18o may come to rest atop the non-demolded section 18i or another structure upon the tread becoming folded, or, in the alternative, after the tread has been folded and additional portions of the tread are demolded. In the later situation, for example, the demolded tread section 18o may come to rest atop the non-demolded tread section 18i or another structure by direction of the demolding path or due to the weight of an unsupported length of the demolded tread section deflecting the demolded tread section downward. Once folded, the demolded tread section is directed away from the first end of the molding cavity by demolding force F. In the embodiment shown, the first end 12a of the tread 10 is shown folded overtop, and elevated above, the non-demolded tread section 18i. It is understood, however, in other variations, the first end 12a may rest upon the non-demolded tread section.

As noted above, removal of the tread from the molding cavity may be accomplished by any means for removing the tread from a molding cavity, including any manual or automatic process, which may be accomplished continuously or in stages. For example, the first end of the tread may be initially removed manually or automatically, and subsequently connected to an automatic tread removal device. With reference to an exemplary embodiment of FIG. 1, a partially demolded tread 10 is shown attached to a tread removal system 30. Tread removal system 30 includes one or more gripping members 32 operably connected to the tread to facilitating application of a demolding force F to tread 10. An gripping member may comprise any member for grasping, clamping, or connecting for the purpose of facilitating the transfer or application of a demolding force to the tread. For example, an gripping member may comprise a mechanical clamping member to grasp the tread as shown, or even a hook, pin, or rod configured to penetrate the tread thickness, such as in a direction generally perpendicular to the direction in which the demolding force is applied. An gripping member 32 may form a part of a demolding force source, or may be operably connected to the demolding force source, such as by way of any connecting member 34.

To reduce the demolding forces as the tread is further demolded from the molding cavity, lubricant is arranged between such sections to reduce friction forces between demolded and non-demolded tread sections as relative translation occurs between such sections. It is understood that lubricant may be placed between demolded and non-demolded tread sections at any time before or after the tread is bent or folded. In the exemplary embodiment shown in FIG. 1, lubricant 50 is applied to the exposed surface 14x of the tread along the non-demolded tread section 18i ahead of the demolded tread section 18o and the tread first end 12a in a demolding direction (that is, in a translation direction of the demolded tread section). In other variations, lubricant 50 may be applied before the tread is folded, whether the lubricant is applied before or after a portion of the tread is demolded. It is also appreciated that when applying the lubricant to an exposed side of the tread, the exposed side of the tread may be associated with either or both the non-demolded section and the demolded section, where the exposed side of the demolded section is same side of the tread that was exposed before the demolded portion was demolded (that is, when the demolded side was a non-demolded portion). It is also appreciated that lubricant 50 may be injected between the folded sections 18o, 18i after the tread is folded. In any event, lubricant 50 is applied to form a layer, coating, or film 50L between sections 18o, 18i.

With reference to FIG. 1, lubricant 50 is generally provided by a lubricant supply system 40, where lubricant is supplied by, and received from, any desired lubricant source for discharge onto the tread. In particular, lubricant 50 is discharged by a lubricant discharge element 42 capable of discharging lubricant by any known means for discharging lubricant. For example, in the exemplary embodiment of FIG. 1, lubricant is discharged from one or more lubricant discharge members 42. In the embodiment shown, each of the one or more lubricant discharging members 42 comprise a nozzle to provide a controlled discharge or pattern of lubricant. The nozzle may comprise any known nozzle, which may provide a fixed or variable discharge flow rate or discharge pattern. For example, the nozzle may discharge lubricant in the form of a stream, spray, mist, and/or drip. It is understood that a flow of lubricant may be discharged in any other manner via any known mechanism, such as by way of an aperture, outlet, or spout. The lubricant may be discharged under pressure, or may be discharge by way of gravity. It is understood that one or more discharge members may be employed to discharge lubricant onto the tread for demolding operations. Furthermore, lubricant is generally supplied to each lubricant discharge member by one or more supply members 44 arranged in fluid communication with a lubricant source. A lubricant supply member may comprise any means for supplying lubricant, such as a conduit, pipe, hose, tank, or a reservoir, for example.

With reference now to FIGS. 2 and 3, a more specific embodiment is shown. In the embodiment, a tongue 19 has been added to the first end 12a of the tread to provide a portion of the tread that may be discarded if damaged during the demolding process. In particular, the tongue forms a portion of the tread to which an gripping member 32 can engage without concern of damaging such portion of the tread. Upon completion of the demolding operations, the tongue can be removed from the tread before using the tread to form a retreaded tire or the like. The molding cavity 22 also includes a corresponding portion for forming tongue 19.

Of further note, the embodiment of FIGS. 2 and 3 provides a tread removal system 30 having a tread gripping member 32 driven along a track to generate and apply the demolding force to the tread. In particular, a drive unit 34 is configured to translate along a track 36 to guide the removal of the tread from the molding cavity.

With continued reference to the embodiment of FIGS. 2 and 3, the lubricant supply system 40 includes a plurality of lubricant discharge members 42 operably attached to the tread removal system 30, and more specifically to a tread gripping member 32. In particular, lubricant discharge members 42 are arranged along a lubricant supply member 44 that is attached to the tread gripping member 32. By doing so, lubricant 50 is discharged and applied to the tread ahead of the portion of the demolded tread section 18o resting atop of the non-demolded tread section 18i as the demolded tread section translates relative the non-demolded tread section and the molding cavity 22 during tread demolding operations. Additional lubricant supply members 44 are provided to arrange the plurality of lubricant discharge members 42 in fluid communication with a lubricant source 48. For example, when the lubricant is water, a water source may comprise any source of water, such as, for example, a water tank or a water tap. Lubricant supply system 40 may also include a flow control device 46, such as a valve or a pump, for example, to better control the supply of lubricant to the discharge members.

While this invention has been described with reference to particular embodiments thereof, it shall be understood that such description is by way of illustration and not by way of limitation. Accordingly, the scope and content of the invention are to be defined by the terms of the appended claims.

What is claimed is:

1. A method of demolding a tread from a mold, the method comprising:
    demolding a first end of a tread from a mold to form a demolded portion of the tread, the tread extending lengthwise from the first end to a second end;
    folding the tread such that at least a portion of the demolded portion is arranged overtop a portion of the tread remaining within the mold;
    applying lubricant to the tread to thereby lubricate relative translation between folded portions of the tread that are in contact; and,
    demolding additional portions of the tread by sliding at least a portion of the demolded portion along the portion of the tread remaining in the mold with the lubricant arranged between the demolded portion and the portion of the tread remaining within the mold.

2. The method recited in claim 1, where the step of applying lubricant comprises applying a lubricant to an exposed side of the tread.

3. The method recited in claim 1, where the step of applying lubricant comprises applying lubricant to the tread, such that lubricant is arranged between the demolded portion and the portion of the tread remaining within the mold.

4. The method recited in claim 1, where the step of applying lubricant forms a layer of lubricant between the folded portions of the tread.

5. The method recited in claim 1, where the step of applying lubricant is performed during the step of demolding additional portions of the tread.

6. The method recited in claim 1, where the step of applying lubricant is performed before the first end is demolded in the step of demolding a first end.

7. The method recited in claim 1, where the step of applying lubricant is performed before the tread is folded in the step of folding.

8. The method recited in claim 1, where the step of applying lubricant is performed by one or more discharge devices.

9. The method recited in claim 1, where the lubricant is a water-based lubricant having one or more additives.

10. The method recited in claim 9, where one or more additives include one or more surfactants.

11. The method recited in claim 10, where the one or more additives include one or more polyoxyalkylene derivatives.

12. The method recited in claim 9, where the lubricant is a mold release composition.

13. An apparatus for demolding a tread, the apparatus comprising:
    a member configured for attachment to a demolded portion of a tread at a first end of the tread, such that the demolded portion of the tread is folded over and arranged in contact with a portion of the tread remaining within a mold during demolding, the tread extending lengthwise between the first end and a second end;
    the member including one or more lubricant discharging elements in operational communication with a lubricant source, each of the one or more lubricant discharging elements configured to discharge lubricant received from the lubricant source onto the tread between the demolded portion and the portion of the tread remaining within the mold, where the lubricant discharged onto the tread thereby lubricates relative translation between the demolded portion of the tread and the portion of the tread remaining within the mold.

14. The apparatus recited in claim 13, where each of the one or more lubricant discharging elements is a nozzle.

15. The apparatus recited in claim 13, where each of the one or more lubricant discharging elements comprise an aperture.

16. The apparatus recited in claim 13, where the member is operably attached to a demolding force source.

17. The apparatus recited in claim 13, where the lubricant is a water-based lubricant having one or more additives.

18. The apparatus recited in claim 13, where the lubricant is water.

* * * * *